United States Patent
Mueller

(10) Patent No.: US 9,272,433 B2
(45) Date of Patent: Mar. 1, 2016

(54) FOOD PRODUCT SLICING MACHINE WITH MOTOR TORQUE ASSISTANCE PROFILE

(75) Inventor: Eckhard Mueller, Balingen (DE)

(73) Assignee: Bizerba GmbH & Co. KG, Balingen (DE)

( * ) Notice: Subject to any disclaimer, the term of this patent is extended or adjusted under 35 U.S.C. 154(b) by 1906 days.

(21) Appl. No.: 10/920,852

(22) Filed: Aug. 18, 2004

(65) Prior Publication Data

US 2005/0045007 A1 Mar. 3, 2005

(30) Foreign Application Priority Data

Aug. 22, 2003 (DE) .................................. 103 39 171

(51) Int. Cl.
| | |
|---|---|
| B26D 1/143 | (2006.01) |
| B26D 5/00 | (2006.01) |
| B26D 7/06 | (2006.01) |
| B23Q 15/013 | (2006.01) |
| B23Q 15/08 | (2006.01) |
| B23Q 15/12 | (2006.01) |

(52) U.S. Cl.
CPC ............ *B26D 7/0616* (2013.01); *B23Q 15/013* (2013.01); *B23Q 15/08* (2013.01); *B23Q 15/12* (2013.01); *B26D 5/00* (2013.01); *B26D 1/143* (2013.01); *B26D 2210/02* (2013.01); *Y10T 83/04* (2015.04); *Y10T 83/141* (2015.04); *Y10T 83/162* (2015.04); *Y10T 83/6475* (2015.04); *Y10T 83/6536* (2015.04); *Y10T 83/9403* (2015.04)

(58) Field of Classification Search
CPC ........ B26D 1/143; B26D 5/00; B26D 7/0616; B26D 2210/02; B23Q 15/013; B23Q 15/08; B23Q 15/10; B23Q 15/12; Y10T 83/141; Y10T 83/162; Y10T 83/6475; Y10T 83/6536

USPC ......... 83/72, 76.1, 360, 367, 403.1, 703, 707, 83/713, 717, 730
See application file for complete search history.

(56) References Cited

U.S. PATENT DOCUMENTS

| | | | | |
|---|---|---|---|---|
| 1,846,924 | A | * | 2/1932 | Van Hoorn ...................... 83/730 |
| 4,813,316 | A | * | 3/1989 | Johnson et al. .................... 83/42 |
| 5,313,160 | A | | 5/1994 | Gloden et al. |
| 5,461,957 | A | * | 10/1995 | Koch et al. ....................... 83/713 |
| 5,544,558 | A | * | 8/1996 | Hughes ........................... 83/75.5 |
| 5,862,730 | A | | 1/1999 | Cartwright et al. |
| 6,516,693 | B1 | * | 2/2003 | Thiele et al. ...................... 83/13 |
| 6,668,692 | B1 | * | 12/2003 | Thiele et al. ...................... 83/74 |
| 6,714,004 | B2 | | 3/2004 | Jagiella |
| 6,931,973 | B2 | * | 8/2005 | Kuchler ............................ 83/13 |
| 2001/0052771 | A1 | | 12/2001 | Jagiella |
| 2002/0050198 | A1 | * | 5/2002 | Kuchler ......................... 83/76.8 |
| 2003/0079589 | A1 | | 5/2003 | Kovacs |
| 2003/0200848 | A1 | * | 10/2003 | Kuchler ............................ 83/13 |

FOREIGN PATENT DOCUMENTS

| | | | |
|---|---|---|---|
| AT | 394 152 B | | 2/1992 |
| DE | 196 14 418 | * | 6/1997 |

(Continued)

*Primary Examiner* — Clark F Dexter
(74) *Attorney, Agent, or Firm* — Leydig, Voit & Mayer, Ltd.

(57) ABSTRACT

In order to improve a food product slicing machine with a circular knife, a carriage for accommodating products to be cut which is guided for displacement parallel to the cutting plane of the circular knife, and a drive motor for the displacement of the carriage, wherein the carriage can be operated manually in a servo operating mode and the operation is assisted by the drive motor, the slicing machine is configured that the assistance by the drive motor in the servo operating mode is dependent on at least one parameter of the carriage movement, wherein the at least one parameter may include the speed or acceleration of the carriage.

15 Claims, 5 Drawing Sheets

(56) References Cited

FOREIGN PATENT DOCUMENTS

| DE | 196 43 538 A1 | 4/1998 |
| DE | 100 25 661 A1 | 12/2001 |
| DE | 102 25 845 A1 | 12/2003 |
| EP | 0 881 045 A2 | 12/1998 |
| EP | 1 047 085 A2 | 10/2000 |
| GB | 2 325 615 A | 12/1998 |
| WO | WO 98/31516 A1 | 7/1998 |

* cited by examiner

FOOD PRODUCT SLICING MACHINE WITH MOTOR TORQUE ASSISTANCE PROFILE

The present disclosure relates to the subject matter disclosed in German application No. 103 39 171.1-26 of Aug. 22, 2003, which is incorporated herein by reference in its entirety and for all purposes.

BACKGROUND OF THE INVENTION

The invention relates to a food product slicing machine with a circular knife, a carriage for accommodating products to be cut which is guided for displacement parallel to the cutting plane of the circular knife and a drive motor for the displacement of the carriage, wherein the carriage can be operated manually in a servo operating mode in which the carriage movement is assisted by the drive motor.

The invention relates, in addition, to a method for the operation of a food product slicing machine in a servo operating mode, comprising a carriage for accommodating products to be cut which is displaceable back and forth parallel to the cutting plane of a circular knife, wherein the carriage can be operated manually in the servo operating mode in which the carriage movement is assisted by a drive motor.

In the case of food product slicing machines for cutting foods such as cold meats and cheese, an automatic operation or a manual operation is customarily provided. During automatic operation, the carriage is moved back and forth on its guide path fully automatically. During manual operation, the corresponding force must be exerted by the operator to move the carriage and, in particular, to guide the carriage with the product to be cut past a circular knife. Food product slicing machines which can be operated in a semi-automatic mode (servo operating mode) are disclosed, for example, in EP 0 881 045 A2 or AT 394 152 B. In such a servo operating mode, the carriage is operated by hand, i.e., guided by hand, wherein the drive motor assists the carriage movement. As a result, a reduced expenditure of force is required.

SUMMARY OF THE INVENTION

In accordance with the invention, a food product slicing machine is provided with improved guidance of the carriage results for the operator.

In accordance with the invention, the assistance by the drive motor in the servo operating mode is dependent on at least one parameter of the carriage movement, wherein the at least one parameter is determined.

As a result of the fact that a parameter such as speed and/or acceleration of the carriage is measured, the assistance for the carriage movement can be controlled accordingly. For example, it is possible in this way for the motor torque of the drive motor to be overproportionally large when the carriage first starts to move (at low speeds) in order to make a smooth and jerk-free starting movement possible. It is also possible for the speed of the carriage to be limited to a maximum speed. In addition, it is possible to prevent the carriage from beginning to move of its own accord when given a slight push.

As a result of the adaptation of the assistance to a parameter of the carriage movement, the operator is given the feeling of an easy-running carriage, wherein a natural feeling for the displacement of the carriage may be achieved.

It is particularly advantageous when the assistance is dependent on the speed of the carriage. In this way, a jerk-free, smooth starting movement of the carriage may, in particular, be achieved. For example, it is also possible for the carriage to be braked automatically when the speed of the carriage decreases, as occurs when the carriage is set going without further manual operation.

It is, in principle, also possible for the assistance, alternatively or in addition, to be dependent on the acceleration of the carriage.

It is particularly advantageous when a motor torque of the drive motor is controlled as a function of the at least one parameter of the carriage movement. In this respect, a flow of current to the drive motor, via which the corresponding motor torque is adjusted, is, in particular, controlled. As a result, the actual carriage movement determines the actual control of the drive motor via the corresponding parameter of the carriage movement, such as speed of the carriage. As a result, the various cases which occur during the carriage movement may be taken into consideration for the servo assistance of the carriage movement; for example, the starting movement can be assisted in an optimum manner and at high speeds the speed of the carriage can be taken into consideration via limitation of the current to the motor. An increased safety may be achieved since, for example, it is possible to prevent the carriage from continuing to run after it has been set going.

A control device is provided, in particular, for controlling the drive motor.

It is particularly advantageous when the drive motor can be controlled in accordance with a predetermined assistance profile. The assistance profile is stored in the control device, for example, in the form of a table or as a function. The assistance profile comprises for specific parameter ranges, such as, for example, speed ranges, the corresponding situations, according to which the drive motor is to be controlled.

It is provided, in particular, for the assistance profile to comprise a travel profile for the carriage. The travel profile serves the purpose of controlling the drive motor for the traveling movement of the carriage.

It has been shown that it is advantageous when the assistance for the carriage movement in the servo operating mode is non-linear in relation to the at least one parameter of the carriage movement. The different cases which occur during the carriage movement can then be taken into consideration; in particular, a smooth and jerk-free starting movement can be achieved with an excessive motor torque or a limitation of the speed of the carriage may be achieved.

It is particularly advantageous when the assistance for the carriage movement is overproportionally greater at low speeds of the carriage than at high speeds of the carriage. As a result, a smooth and jerk-free starting movement of the carriage may be achieved. For the operator, this results in the impression of an easy-running carriage with a natural feeling for the travel of the carriage.

It is favorable when the travel profile has a start-up range for low speeds, a central range for average (i.e., medium) speeds and a limiting range for high speeds.

In the start-up range, the travel profile is favorably the steepest with respect to the at least one parameter of the carriage movement. When the carriage starts to move, a relatively high motor torque must be exerted proceeding from a zero motor torque in order to move the carriage. When the motor torque increases to an overproportionally great degree with the parameter, for example, the speed of the carriage, a smooth and jerk-free starting movement results.

In the limiting range, the travel profile is preferably the flattest with respect to the at least one parameter of the carriage movement. As a result, a limitation of the speed of the carriage may be achieved, in particular, when the assistance (and, therefore, the motor torque or rather the current flowing to the motor) also has a limiting value accordingly.

The gradient in the travel profile in the central range is preferably between the gradient in the start-up range and the gradient in the limiting range. In the central range, the assistance profile can be more or less linear.

It is particularly advantageous when the motor torque is limited to a maximum value, i.e., a maximum current value is provided for the current flowing to the motor. As a result, the speed of the carriage can, on the other hand, be limited to a maximum value so that an increased safety is provided.

It can be provided for the strength of the assistance to be adjustable and, in particular, adjustable by an operator. As a result, the type of product to be cut can, for example, be taken into consideration, or the operator himself can be taken into consideration; for a strong person, the strength of assistance can be set so as to be less than for a weaker person. Such an adjustability may be realized due to the fact that a basic assistance profile is stored in table form and an operator can select an adjustment factor. The actual motor current of the drive motor during a specific state of movement of the carriage then corresponds to the associated basic value according to the basic assistance profile, multiplied by the factor previously set.

It is also possible for the assistance profile to be adjusted in order, for example, to be able to detect different types of food products to be cut or different operating personnel.

It may also be provided for an assistance profile to be generated in a learning mode by specifying the carriage movement. In such an adaptive learning process, an operator can then specify the assistance profile he requires by specifying the carriage movement.

It is particularly advantageous when a braking assistant can be activated when the carriage movement slows down and/or the carriage is braked manually. In order to reverse the movement of the carriage, the operator must brake the carriage in its movement and then push it in the opposite direction. For this purpose, a force is, on the one hand and in principle, necessary in order to remove energy from the carriage movement. In addition, the operator must also overcome the motor torque of the drive motor in the case of servo-assisted food product slicing machines known from the state of the art. As a result of the inventive provision of a braking assistant, the reversal of the carriage may be achieved by the operator with far less expenditure of force. As a result, the product to be cut may, on the other hand, be cut in shorter times since, on account of the lesser expenditure of force, the operator can also move the carriage more quickly. In addition, safety is increased since it can be ensured by means of the braking assistant that the carriage does not run on its guidance path in an uncontrolled manner.

The braking assistant is activated, in particular, in the case of a negative acceleration of the carriage, i.e., during a deceleration of the speed. Such a negative acceleration can be caused by an operator who initiates a return movement of the carriage. A negative acceleration also occurs when, for example, the carriage is pushed in one direction without additional operator guidance. In this case, the braking assistant provides for an automatic braking and, in particular, stopping of the carriage in order to prevent any uncontrolled running through. A deceleration of the speed may be detected in a simple manner via a time-related determination of travel with respect to the carriage movement.

In one embodiment of the inventive food product slicing machine it is provided for a motor torque value, which results in accordance with an assistance profile, to be modified when the braking assistant is activated. The assistance profile, which can be stored in the form of a table, allocates a specific motor torque value, for example, to a specific speed value.

When the braking assistant is activated, this motor torque value predetermined for a given speed is modified in order to cause the carriage to be braked. This modification is brought about automatically. When the braking assistant is activated once a deceleration in the speed has been detected, an automatic modification of the corresponding motor torque values takes place in order to bring about braking of the carriage, in particular, to the speed zero.

This can be achieved, for example, in that the motor torque value which results for a predetermined speed in accordance with the assistance profile is multiplied with a braking factor. In this respect, the braking factor is smaller than one in order to bring about a deceleration of the speed. It can also take on negative values in order to bring about just such a braking. The braking factor or factors can be stored, for example, in a table. They are selected such that braking results. A braking factor, which leads to the setting of a new motor torque value, is then specified for an actual speed when the braking assistant is activated. A new speed is then set with a new motor torque value in accordance with an assistance profile. This new motor torque value can, again, be multiplied with a braking factor. This procedure preferably takes place for such a time until the carriage is brought to a complete standstill.

It may be provided for a series of braking factors to be specified within a given time frame. The braking factors determine a braking function of the braking assistant. For example, a series of predetermined braking factors is run through in accordance with a characteristic curve in a time frame having a total duration of 10 ms, wherein the braking factors are selected such that braking is achieved with the result of a complete standstill of the carriage.

The series also comprises, in particular, negative braking factors in order to bring about an explicit braking force by way of an (at least temporary) negative motor torque in relation to the direction of movement of the carriage to be braked.

When an operator moves the carriage, this normally takes place as far as the return point of a carriage guide which is remote from the operator. When this return point is reached, the product to be cut is cut through completely. The operator then moves the carriage in the opposite direction, wherein the carriage is not normally moved as far as the other (forward) return point of the carriage guide which faces the operator. As a rule, the distance covered is shortened in that the operator already reverses the movement prior to the forward return point of the carriage guide. As a rule, the forward return point is only reached when a wide product to be cut is accommodated on the carriage. In accordance with the invention, it may be provided as a safety function that the carriage is braked when, after reaching the return point of the carriage guide remote from the operator, it reaches the other return point within a predetermined period of time. There is the fundamental risk that, when a carriage is pushed on from the (rearward) return point, it runs to the other return point, experiences a counter momentum and again runs to the preceding return point and thus travels back and forth on its guide path in an uncontrolled manner. As a result of the inventive safety function, a check is made to see whether the carriage, starting from the rearward return point, has reached the other return point within a predetermined period of time. If this is the case, the carriage is braked in that, for example, a short braking pulse is generated by the drive motor for the carriage which is sufficient to brake the carriage to such an extent that its continued running is prevented.

The predetermined period of time for the running through between the two return points is calculated such that times within this period of time correspond to an uncontrolled running of the carriage. A check is made, in particular, to see whether the time which the carriage requires is within this period of time. The period of time preferably extends from the time zero up to an upper limit. The period of time can be stored as fixed data in the control device. It is also possible to calculate this period of time as a function of actual apparatus parameters. It is also possible to calculate the strength and length of the braking pulses or to use stored data. For example, the period of time can be specified with its upper limit such that the corresponding limit time is that time which the carriage requires to run through the distance between the two return points with a predetermined speed, wherein the predetermined speed can be a typical or average speed of the carriage on its path guide.

It is advantageous when, in addition to the servo operating mode, an automatic operating mode is also provided, in which the carriage is moved back and forth automatically. It is possible, in particular, to switch over between servo operating mode and automatic operating mode.

It is possible for an inventive food product slicing machine to have only an automatic operating mode and servo operating mode. Provision need then no longer be made for the carriage to be disengaged. It is, however, also possible for a manual operating mode to be provided in addition, in which the carriage is movable purely manually. In this case, as well, a corresponding possibility is provided for switching over between servo operating mode and manual operating mode or between automatic operating mode, servo operating mode and manual operating mode.

It is particularly advantageous when a sensor is provided for the detection of the at least one parameter of the carriage movement. The sensor can determine this parameter directly or indirectly. For example, the speed and/or the acceleration of the carriage can be determined via a time-related location determination of the carriage position.

It is particularly advantageous when a displacement measuring device is provided, via which each position of the carriage along its guide path can be determined absolutely at any point in time at least during the operation of the food product slicing machine. Such a food product slicing machine with absolute determination of the position on the path is disclosed in German patent application No. 102 25 845.7 of Jun. 5, 2002, of the same company, which is not a prior publication; reference is expressly made to this application. In the case of such an absolute displacement measuring device, the carriage position and, therefore, the carriage speed or carriage acceleration can be determined with great precision free from any reference positions. The drive motor may, again, be controlled in accordance with an assistance profile, proceeding from the at least one parameter of the carriage movement.

Furthermore, in accordance with the invention, a method is provided with which optimized operating possibilities result for the operator.

In accordance with the invention, at least one parameter of the carriage movement is determined and that the carriage movement is assisted as a function of the parameter.

The inventive method has the advantages already explained in conjunction with the inventive food product slicing machine.

Additional, advantageous developments have likewise already been explained in conjunction with the inventive food product slicing machine.

The drive motor for the carriage is, in particular, controlled in accordance with an assistance profile. As a result, the different conditions during the traveling movement of a carriage can be detected in a concerted manner during the control of the carriage movement; the start-up behavior can, in particular, be explicitly adjusted in order to facilitate a jerk-free and smooth starting movement in this way.

In this respect, it is advantageous when the assistance profile has a travel profile. The traveling movement of the carriage can be controlled via the travel profile whereas the braking of the carriage may be controlled via a braking function with a characteristic curve.

It is favorable when the assistance (i.e., the motor torque which is set by the motor current) is overproportionally greater at low speeds of the carriage than at high speeds of the carriage. As a result, a smooth and jerk-free starting movement is made possible.

It is advantageous when a braking assistant is activated when the carriage slows down and/or when an, in particular, manual braking force is exerted on the carriage. As a result, the expenditure of force for braking the carriage and for reversing the carriage movement is reduced. It is also possible for the carriage to be braked automatically when the speed is reduced and so any uncontrolled continued running of the carriage is, for example, prevented.

It may be provided for a motor torque predetermined in accordance with an assistance profile at a specific speed of the carriage to be modified at predetermined points in time when the braking assistant is activated. The motor torque is then modified accordingly such that an assisted braking is brought about in order to, in particular, reduce the expenditure of force on the part of an operator for braking the carriage.

It may, in addition, be provided for the motor torque predetermined in accordance with an assistance profile to be multiplied with a braking factor of less than one in order to determine the actual motor torque acting on the carriage and then act accordingly on the drive motor with a current such that this motor torque results. The braking factor may be specified, for example, in the form of a table.

A braking function or a characteristic curve of the braking assistant may be realized in that a series of braking factors are specified in a given time frame. The series of braking factors is processed in such a time frame, which has a specific duration of, for example, 10 ms and is subdivided into, for example, uniform time sections, in order to obtain a resulting motor torque value within the time frame at the given times. The braking factors are selected such that braking is achieved, in particular, to the speed zero.

It is favorable when the braking factors become smaller in the time frame when the times become longer and, in particular, negative braking factors are specified when the times become longer. The motor torque is first of all reduced in order to slow the carriage down proceeding from a detection point in time, at which a slowing down in the speed is detected. When the times become longer, a negative motor torque is generated by negative braking factors in order to effect a motor countertorque for a short time which provides for a braking force which brakes the carriage. The braking factors are selected such that the braking takes place to the speed zero in order to take the energy out of the carriage movement in this way.

It may be provided for a characteristic curve of the braking assistant to be followed in the direction of greater motor torques of the drive motor when the speed of the carriage is increased and the braking assistant is activated. Such an increase in the speed of the carriage when the braking assistant is activated may be present when an operator moves the carriage again in the other direction. When the characteristic curve of the braking assistant is not followed completely but is followed in the direction of greater motor torques (which means in the direction of greater braking factors), a smooth transition between braking and normal flow of current to the drive motor may be achieved.

Time intervals are then selected, in particular, to be smaller than during the braking of the carriage, for example, half as long in order to achieve a smooth transition between braking function and normal flow of current (which corresponds to the normal drive of the carriage).

The following description of preferred embodiments serves to explain the invention in greater detail in conjunction with the drawings.

DETAILED DESCRIPTION OF THE INVENTION

Figure 1:
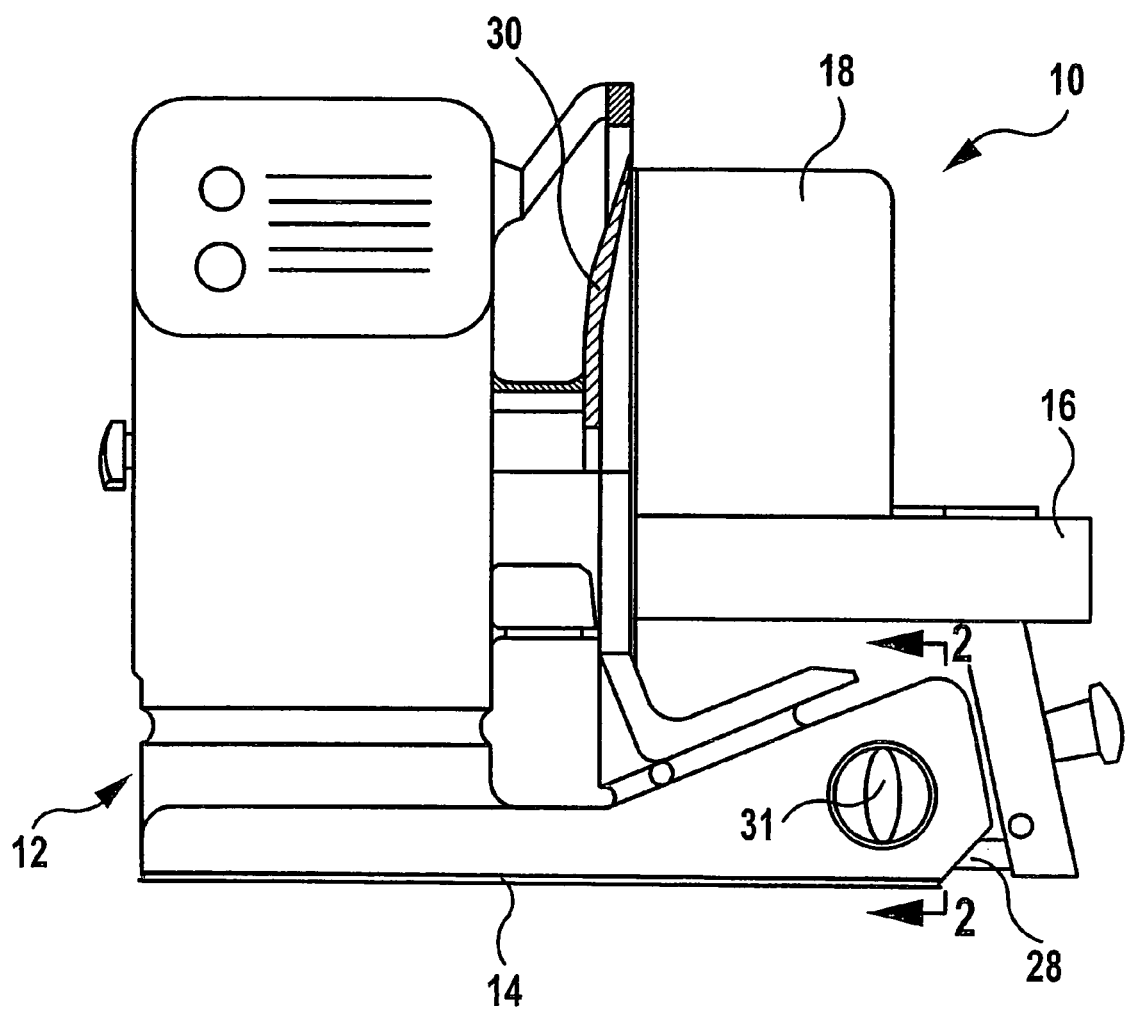
FIG. 1 shows a front view of an inventive food product slicing machine.

One embodiment of an inventive food product slicing machine which is designated in FIG. 1 as a whole as 10 comprises a machine housing designated as a whole as 12. This has a standing surface 14, with which the food product slicing machine 10 can be placed on a base, such as, for example, the surface of a table.

A carriage 16 for accommodating products to be cut is mounted on the machine housing 12 for displacement back and forth on a guide path between two return points. This carriage 16 is provided with a rear wall 18, on which the product to be cut, for example, cold meats, cheese or fish, can abut.

The carriage 16 is driven by a drive motor 20 (FIG. 2) for its displacement movement on its guide path, wherein the displacement back and forth is brought about automatically via the drive motor 20. The drive motor 20 is arranged in the machine housing 12 so as to be protected. A semi-automatic mode of operation is provided (servo operating mode), with which the manual operation of the carriage movement is assisted by the drive motor 20. This will be explained in greater detail further on. In an automatic operating mode, an automatic displacement back and forth of the carriage 12 is brought about without any operator guidance. It is possible to switch over between automatic operating mode and servo operating mode.

In addition, a manual operating mode may be provided, in which the carriage 16 can be operated only manually.

A toothed belt 24 is driven via the drive motor 20 in the direction of displacement 26 of the carriage 16 via a carriage drive element, for example, with the aid of a deflecting roller 22. A carriage foot 28 is coupled to this toothed belt 24 and is taken along via the movement of the toothed belt 24 in its direction of displacement 26 (displacement back and forth).

Furthermore, a circular knife 30 is mounted for driving on the machine housing 12, wherein the drive motor is arranged in the machine housing 12 so as to be protected (not shown in the drawings). As a result of the displacement back and forth of a product to be cut on the carriage 16 past the rotating circular knife 30, slices of an adjustable thickness are cut from the product to be cut. In this respect, the displacement of the carriage 16 is parallel to a cutting plane of the circular knife 30. This cutting plane can be located vertically or at an angle to the standing surface 14; in the latter case, the food product slicing machine 10 is designated as an angle slicer.

The food product slicing machine 10 has, in particular, a knife protection lock (not shown in the drawings) which is effective when the carriage 16 is pivoted away from the machine housing 12 or removed for the purpose of cleaning.

A grinding device and/or a cleaning device for the circular knife 30 can also be provided (not shown in the drawings). In addition, a device for depositing a product cut into slices can also be present (likewise not shown in the drawings).

An absolute displacement measuring device designated as a whole as 32 (FIG. 2) is arranged in the machine housing 12 and the position of the carriage 16 on its guide path may be determined absolutely by means of this device. With this displacement measuring device 32, the position of the carriage 16, in particular, relative to the machine housing 12 may be determined and, for example, the distance of the carriage 16 in relation to a fixed point of the machine housing 12. In principle, this fixed point can be random.

Figure 2:
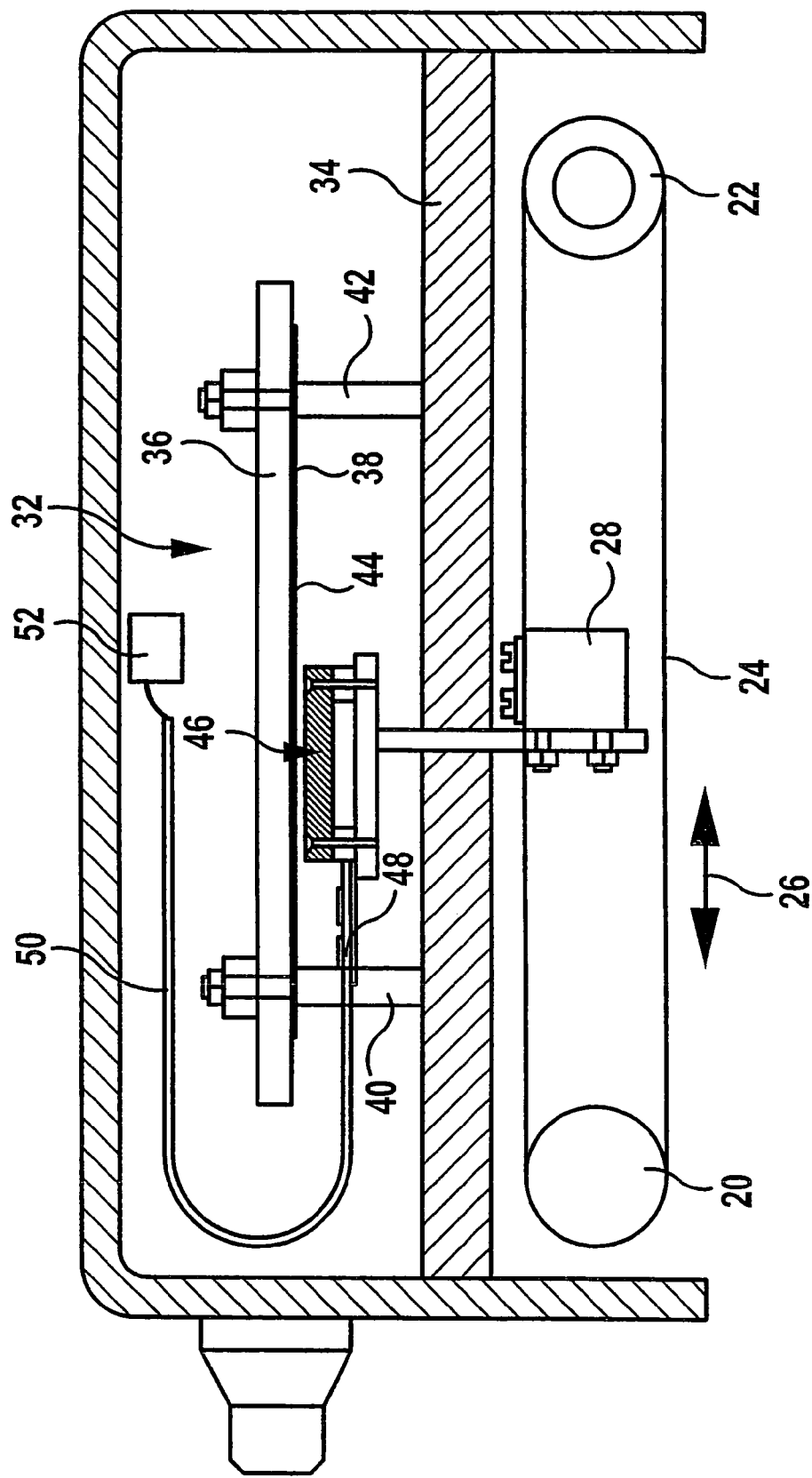
FIG. 2 shows a partial sectional view along line 2-2 according to FIG. 1 with one embodiment of an inventive displacement measuring device.
Figure 3:
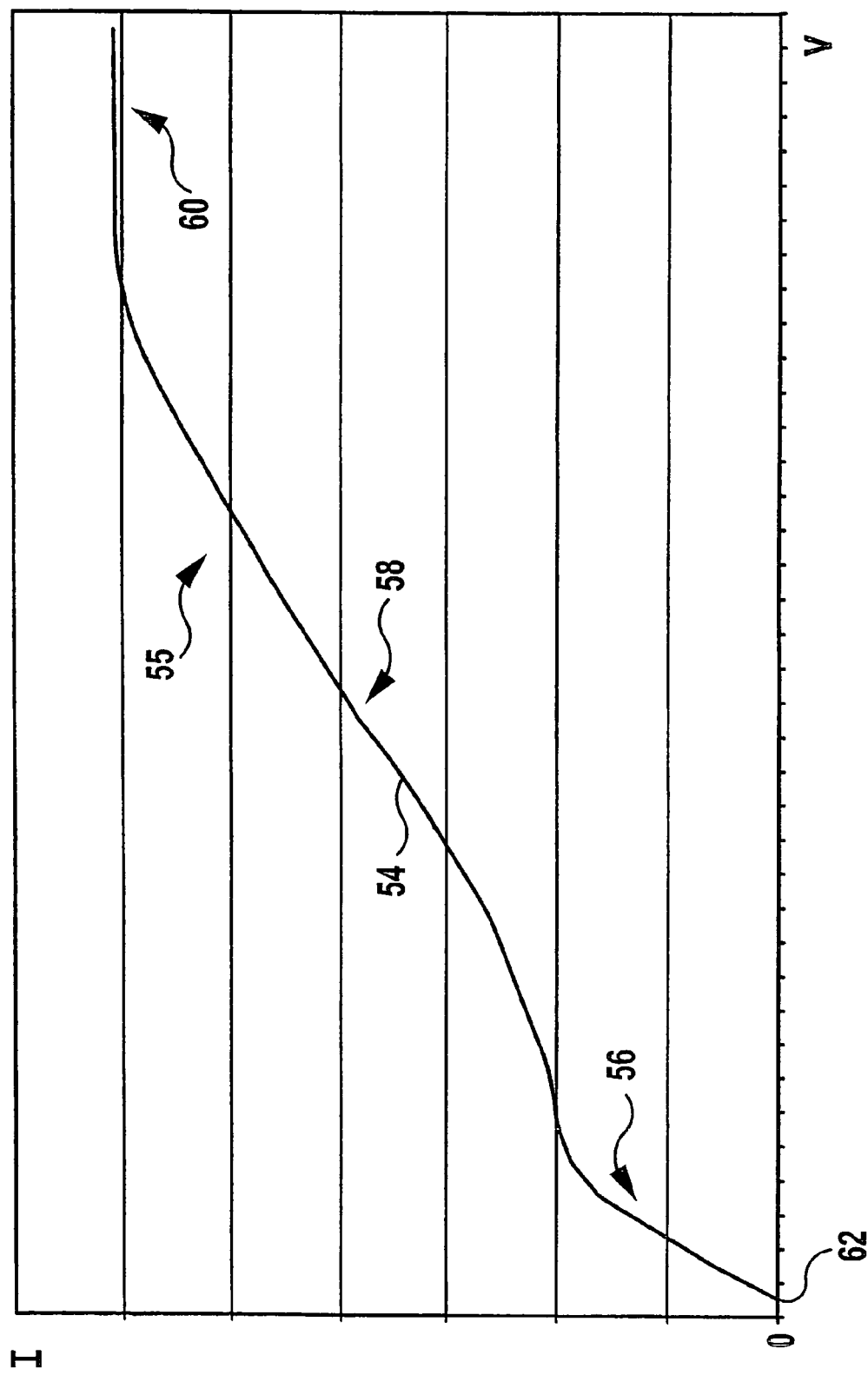
FIG. 3 shows an example of an assistance profile with motor current over speed of a carriage.

In the embodiment shown in FIG. 2, a guide bar 34 extending in the direction of displacement 26 is arranged in the machine housing 12 and this serves to guide the carriage 16 on its guide path. A support 36 for a transmitter device 38 of the displacement measuring device 32 is held on this guide bar 34. For this purpose, spaced support spacer members 40, 42 are provided, on which the support 36 is mounted in the area of its respective ends.

In one embodiment, the transmitter device 38 comprises a magnetic tape 44 as a transmitter which is arranged on the support 36 so as to face the carriage foot 28 and is, in particular, glued to it. It may also be provided for the magnetic tape 44 to be screwed to the support 36 in the area of its ends.

The magnetic tape 44 comprises at least two tracks with a magnetic coding, the tracks extending essentially parallel. This coding is formed in the tracks transversely to the direction of displacement 26 from magnetic segments of different widths. As a result, the magnetic tape 44, which is a transmitter 44 with magnetic properties which vary along the direction of displacement 26 and may be read accordingly via a sensor device 46. The sensor device 46 comprises, for example, a plurality (in accordance with the number of tracks) of sensors sensitive to magnetic fields. The magnetic coupling of the sensor device 46 to the magnetic tape 44 is, therefore, dependent on the position of the sensors of the sensor device 46 relative to the magnetic tape/transmitter 44, whereby the position of the carriage 16 relative to the machine housing 12 (on which the magnetic tape/transmitter 44 so as to be non-displaceable) may, again, be determined absolutely.

The sensors of the sensor device 46 are sensors sensitive to magnetic fields, for example, Hall sensors which detect the local magnetic field of the magnetic tape 44. On account of the variation of the corresponding field along the direction of displacement 26, the distance in relation to the magnetic tape 44 may, therefore, be determined from the (analog) sensor signal and, therefore, the position of the carriage 16 may be determined.

For this purpose, the sensors of the sensor device 46 are non-displaceable and, in particular, rigidly connected to the carriage foot 28 so that they are moved over the magnetic tape 44 when the carriage is moved back and forth. This location information and, thus, the information concerning the position of the carriage 16 may be determined without any contact since the sensors can determine the location information from the magnetic tape 44, which they face due to their arrangement, free from any contact. During the displacement of the carriage 16, the sensors glide over the magnetic tape/transmitter 44, for example, at a distance in the order of magnitude of 1 mm.

Transmitter-sensor combinations, with which the distance information on the transmitter is coded magnetically, are known, for example, from DE 196 43 538 A1 and EP 1 047 085 A2, to which reference is expressly made.

A cable guide 48 for supply cables and signal cables for the sensor device 46 is designed such that the cable connections move with the carriage 16 accordingly during its movement back and forth. In this respect, the electric coupling is brought about, in particular, via a cable 50 which is laid so as to be movable such that this cable, with its connection to the (entrained) sensors, follows the movement during the displacement of the carriage foot 28.

In each position of the carriage 16, sensors of the sensor device 46 are located opposite the magnetic tape/transmitter 44, wherein the signal impingement on the sensors, for example, Hall sensors, is dependent on the location on the magnetic tape 44, opposite which the respective sensor is located. As a result, the position of the carriage 16 is determined relative to the machine housing 12 and, therefore, absolutely via an analog evaluation. This detection of the carriage position takes place in every position of the carriage 16 and, in particular, also at any point in time. The corresponding information is transmitted to a control device 52. With the aid of determined position data, the food product slicing machine 10 may be controlled in many ways. In particular, the drive motor 20 may be controlled via the detected position data in order to initiate braking procedures during the automatic operating mode and effect a reversal of the carriage.

On account of the absolute determination of the carriage position, it is not necessary for its detection to proceed from a reference position which has to be approached previously by the carriage but rather the exact position of the carriage 16 is obtained at each position of the carriage and at any point in time independently of the prior history of the carriage movement since this position is measured anew each time—and, therefore, constantly. As a result, the speed of the carriage 16 may also be determined as an additional parameter of the carriage movement at any point in time of the carriage movement. It is, therefore, also possible to determine the acceleration of the carriage.

On account of this exact position determination, speed determination and acceleration determination of the carriage 16 which is free from any previous history, a plurality of control possibilities result for the food product slicing machine, in particular, when its operation is started, during its operation and when its operation is stopped.

For example, the carriage 16 can also be moved on the machine housing 12 into an insert position for products to be cut which is favorable for the operator, in particular, for the semi-automatic operation or manual operation of the carriage 16. Also in the case of automatic operation, with which the carriage 16 is driven by the drive motor 20, this basic position can be placed such that it is favorable, for example, for the control of the carriage movement.

For example, for controlling the depositing of slices of a product cut into slices, the position of a cutting edge of the machine at which a slice of the product to be cut is separated reliably can be adjusted either internally (by means of software) or externally and variably via an operator input. The cutting edge of the machine is defined as an edge at which a slice of the product to be cut is separated reliably at it. The cutting edge is independent of the diameter of the product to be cut. If the cutting edge is set accordingly, the carriage need not travel through the entire distance, for example, as far as a stop during the movement back and forth and so the cutting frequency may be increased as a result.

The forward return point is dependent on the diameter of the product to be cut. This return point can also be variably adjusted, for example, externally via a keyboard input. The control device 52 can then initiate the return movement via the position determination of the carriage 16 when the set positions are reached, wherein the fact that these marked positions are reached is detected via the displacement measuring device 32.

The commuting of the drive motor 20 may likewise be controlled via the control device 52, wherein the control is based on the position data.

No more pulse counting need be carried out, in particular, as a result of the absolute and, in particular, analog position determination (distance determination) via the displacement measuring device 32 in order to control the movement of the carriage 16 on its guide path.

When using a cleaning device or grinding device for the circular knife 30, the switching on of these devices may be controlled via the control device 52 such that this is allowed only when the carriage 16 is in a specific basic position away from the circular knife 30 and so operational safety is increased in this way.

In the case of a food product slicing machine 10 which has both an automatic operating mode and a manual operating mode and/or a semi-automatic operating mode with a switchover function, the carriage 16 may be disengaged from the drive motor 20 for the manual operating mode in that the carriage foot 28, in particular, is disengaged from the toothed belt 24 or be switched over into the servo operation mode (semi-automatic operation).

It may then be determined via the displacement measuring device 32 whether the carriage 16 has moved at all. The control device 52 can, in the case of no movement, provide for the rotational movement of the circular knife 30 to be switched off in order to avoid having a knife which is still running during a non-operational phase for safety reasons.

It is possible as an additional safety function for the circular knife 30 to be operated again only when an adjusting device 31 for the thickness of cut is set to a position "zero" or "less than zero". The adjusting device 31 for the thickness of cut comprises, in particular, a turning knob 31.

The type of movement of the carriage 16, i.e., for example, whether this is moved manually or automatically, may also be determined via the control device 52 via the determination of additional parameters of the carriage movement and, in particular, the speed of the carriage 16 from the data which are supplied by the displacement measuring device 32 in that the corresponding position data are detected in a time related manner. This may be used for the purpose of concertedly controlling the carriage movement when a switchover takes place from manual operation into automatic operation. If, for example, the carriage 16 is still being moved manually while a switchover to automatic operation has already taken place, no sudden jerky movement of the carriage 16 should occur due to the switching in of the drive motor 20. As a result of the displacement measuring device 32, it may, however, be ascertained whether the carriage is still being moved manually during the switching over to automatic operation. The drive motor 20 may then be synchronized accordingly from the data supplied by the displacement measuring device 32 in order to bring about a "smooth" starting of the automatic carriage movement in relation to the manual carriage movement.

In the embodiment shown in FIG. 2, the transmitter 44 of the transmitter device 38 is stationary and the sensors of the sensor device 46 are moved with the carriage 16. It is, in principle, also possible for one or more corresponding sensors to be arranged on the machine housing 12 so as to be stationary while the transmitter or transmitters is/are moved with the carriage 16. The arrangement is, in principle, as shown in FIG. 2 only that transmitter device and sensor device are reversed and thus the stationary device (the sensor device) has to be supplied with energy and is coupled to signal lines.

Such a displacement measuring device may be designed, for example, in that the sensor comprises an inductive element, for example, a print spool which has a varying cross section in the direction of displacement 26.

The transmitter device displaceable with the carriage 16 then comprises a magnet and is, in particular, formed by one or more permanent magnets; the moving element of the transmitter device-sensor device unit can then be guided free from any cables.

In this embodiment, the magnet/transmitter is coupled inductively to the inductive element and the corresponding, absolute location information with respect to the position of the carriage 16 may be obtained, for example, by determining the quality of the inductive element.

A corresponding displacement measuring device is described in DE 100 25 661 A1 or US 2001/005277 A1, to which reference is expressly made.

The displacement measuring device 32 can also be a magnetorestrictive system, wherein the transmitter is, again, a magnet. Such a magnetorestrictive system is described, for example, in U.S. Pat. No. 5,313,160, to which reference is expressly made.

It is, in principle, also possible to determine the position of the carriage 16 on its guide path relative to the machine housing 12 optically in that, for example, a distance measurement is carried out by means of a laser beam, wherein the laser source is preferably fixed in relation to the machine housing 12.

Apart from a contact-free measurement, it is also, in principle, possible for a resistance measurement to be carried out in order to determine the absolute position of the carriage 16. For this purpose, the displacement measuring device 32 comprises, for example, a resistance path and a contact path which are arranged on the support 36 so as to be located opposite one another. In this respect, the resistance path and the contact path are designed, in particular, as a type of film, wherein the two films are arranged one above the other.

A pressure pin is seated on the carriage foot 28 and this is moved with the carriage 16, wherein the pressure pin itself is seated non-displaceably on the carriage foot 28. This pressure pin presses the two films together which effects a contact between the resistance path and the contact path. When resistance path and contact path are configured accordingly, a resistance may then be determined which is dependent on the position of the carriage 16 relative to the support 36 and, therefore, to the machine housing 12. For example, resistance path and contact path may be configured such that the change in the resistance during the displacement of the carriage 16 back and forth on its guide path is linear as a function of a specific reference point which is fixed in relation to the machine housing (for example, linearly increasing during movement away from this specific reference point and linearly decreasing during movement towards this reference point).

It may also be provided for the drive motor 20 to be coupled via a carriage drive element, such as the deflection roller 22, to an absolute angle measuring device which determines the rotary position of the corresponding drive element, the rotation of which is converted into a linear movement of the carriage 16. The absolute carriage position may then be determined from this rotary position. It may, however, also be provided for the carriage itself, with its linear movement, to drive a rotatable element, from the rotary position of which the carriage position is determined absolutely.

Such an absolute angle measuring system can, again, comprise a transmitter device and a sensor device, wherein, as described above, the transmitter device can be arranged on the machine housing so as to be stationary relative to the sensor device. For example, a transmitter is a magnetic tape as described above and the sensor is then a sensor sensitive to magnetic fields, such as a Hall sensor, in order to read the angular position.

It may, however, also be provided for the sensor to be a sensor which is arranged so as to be stationary in relation to the machine housing 12 while the transmitter is a magnet rotating with the drive element. Reference is made to DE 100 25 661 A1 or US 2001/005277 A1.

In order to detect parameters of the carriage movement and, in particular, the speed of the carriage 16 in the servo operating mode, an incremental counter device may also be provided which does not determine the carriage position absolutely but rather in relation to a reference point which acts as starting point for any counting.

In accordance with the invention, the assistance for the carriage movement in the servo operating mode is brought about by the drive motor 20 as a function of at least one parameter of the carriage movement, wherein for the movement of the carriage 16 the assistance is, in particular, dependent on the extent of the speed of the carriage 16. The flow of current I to the motor is, therefore, dependent on the speed v of the carriage. The speed v of the carriage is determined via the displacement measuring device 32. The flow of current to the motor determines the motor torque which the drive motor 20 exerts on the carriage 16.

The assistance for the carriage movement is brought about via an assistance profile 54 which is stored, for example, in the form of a table or as a function in the control device 52. The assistance profile 54 is predetermined and in the servo operating mode the drive motor 20 is controlled in accordance with the assistance profile.

It may be provided for the assistance profile 54 itself to be adjustable by the operator, wherein different assistance profiles are then stored in the control device 52. For example, a special assistance profile can be selected as a function of the product to be cut and/or as a function of the person operating the machine. In the case of hard types of cold meats, a greater force has to be fundamentally used for the movement of the carriage 16 during the cutting procedure than, for example, for soft types of cold meats or for cheese. Consequently, an assistance profile may be provided which is adapted to hard types of cold meats and an assistance profile which is adapted to soft types of cold meats or cheese. Assistance profiles dependent on the operator can take into consideration whether the operator wishes to move the carriage 16 with more force in the servo operating mode or with greater assistance and thus less force.

Various forms of assistance profile may, for example, be stored in table form, wherein these assistance profiles differ in a non-proportional manner. It may also be provided for a basic assistance profile to be stored, for example, in the form of a table for one type of assistance profile. Proceeding from this basic assistance profile, proportional assistance profiles may be generated by way of multiplication with a fixed factor. This factor can, in particular, be adjusted. As a result, the strength of the assistance may be adjusted.

The assistance profile 54 has in a travel profile 55 a start-up range 56, a central range 58 and a limiting range 60.

The start-up range 56 is at low speeds starting from the speed zero. In this range, the gradient of the assistance profile in relation to the speed v as parameter of the carriage movement is the greatest. In this case, with the non-linear assistance profile 54, the relative change in the flow of current to the motor and, therefore, the motor torque (and, therefore, the assistance for the carriage movement) is the greatest, i.e., the motor torque is, in this case, overproportional. This brings about a greater assistance for the operator during the starting movement of the carriage 16 by way of manual operation. The operator is given the feeling, as a result, that the carriage is easy-running.

In addition, it is ensured as a result that the carriage 16 does not begin to travel of its own accord as a result of a slight push. This is also assisted by the fact that the assistance profile does not begin at the speed zero in the start-up range 56 but rather at a finite speed 62 which is very close to zero.

As a result of the assistance profile 54 being designed in the start-up range 56 with a steep characteristic curve, a smooth and jerk-free starting movement is achieved for the carriage 16.

In the central range 58 at average speeds, the assistance profile 54 is flatter than in the start-up range 56. In this respect, it may be provided for the assistance profile in the central range 58 to be at least approximately linear.

In the limiting range 60, the flow of current to the motor (and, therefore, the motor torque) is even flatter than in the central range 58, wherein the flow of current to the motor is, in this case and in particular, essentially constant. This means that in this speed range the flow of current to the motor is limited and, therefore, the speed of the carriage 16 is also limited. As a result, it is possible to avoid the carriage 16 reaching speeds which are too high, i.e., the speed of the carriage 16 is limited via the configuration of the assistance profile 54 in the limiting range 60.

As a result of the configuration of the assistance profile 54, the operator is given a natural feeling when moving the carriage 16; the operator has the feeling that the carriage 16 is easy-running—in the servo operating mode, the manual operation of the carriage 16 is controlled according to the assistance profile 54 by the drive motor 20 dependent upon the speed.

In principle, it may be provided for the strength of the assistance to be adjustable in that different assistance profiles 54 can be selected or the steepness of one assistance profile can be adjusted, in particular, in the start-up range 56 and in the central range 58. This may be brought about, as described above, by setting a factor proceeding from a basic assistance profile.

It may also be provided for it not to be the speed of the carriage 16 which is selected as parameter but rather the acceleration of the carriage 16. It is also possible to use the speed and the acceleration together as parameters.

It may also be provided for an assistance profile to be adjustable in a learning mode (teach-in mode) in that an operator moves the carriage 16 and an assistance profile is then determined from this movement and again stored.

Figure 4:
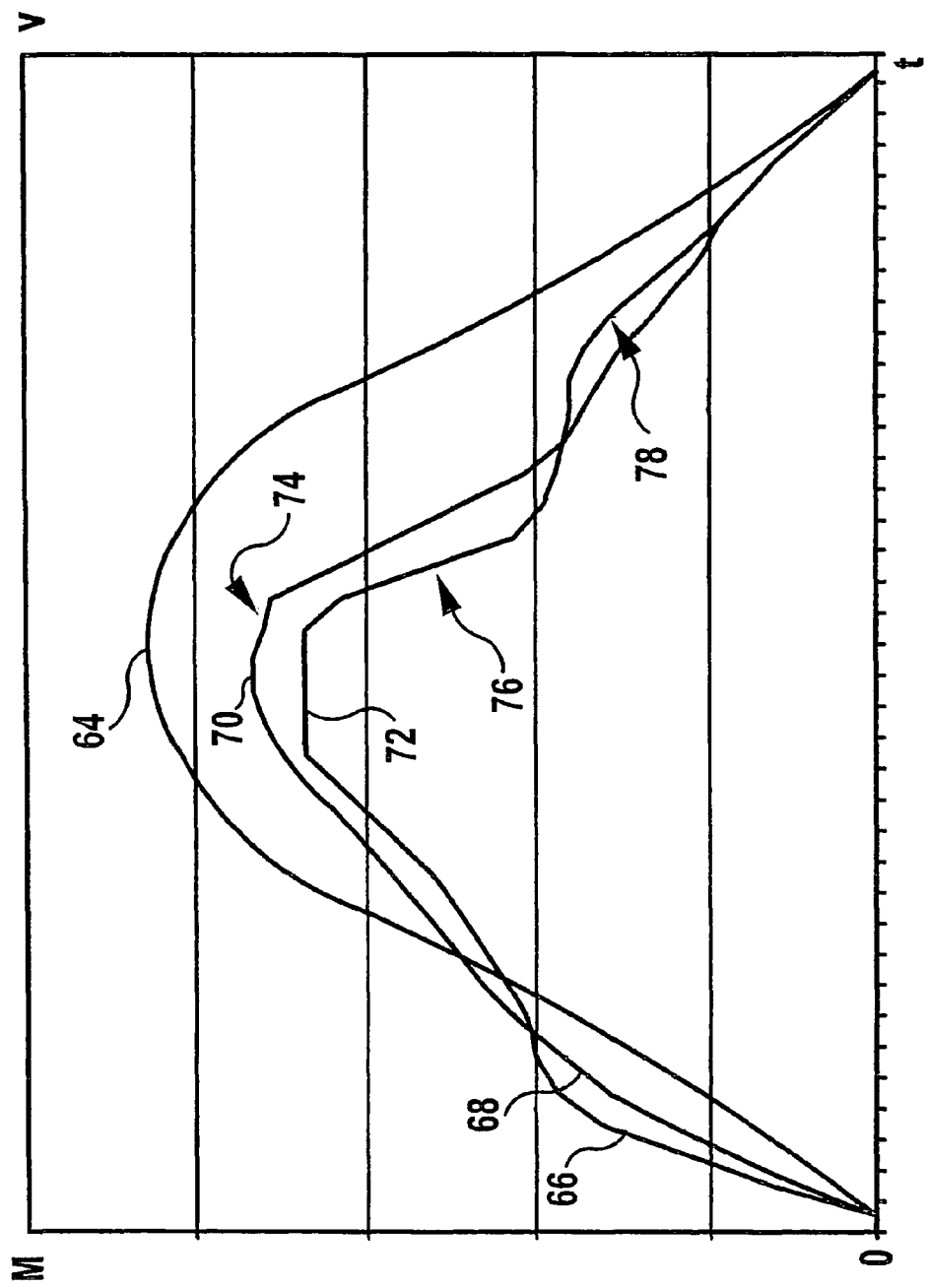
FIG. 4 shows motor torque M and adjustable speed in their dependence on time.

In FIG. 4, a speed curve 64 is shown over the time t and the time curve of the motor torque 66 which occurs when the drive motor 20 is controlled in accordance with the assistance profile 54. Furthermore, the speed 68 of the carriage 16 is shown which occurs when the drive motor 20 has the motor torque 66.

A steep start-up range is again apparent at low speeds with an overproportionally large motor torque, wherein the speed 68 is then limited to a maximum value 70 in the limiting range. In this case, the maximum value 72 of the motor torque 66 is also essentially constant. The assistance for the carriage movement is, therefore, limited for the maximum value 72 of the motor torque 66.

In accordance with the invention, a braking assistant is also provided which is effective when the speed of the carriage 16 decreases, i.e., a negative acceleration is effective, or a manual braking force is exerted on the carriage 16 which also causes a negative acceleration. The braking assistant is activated when a reduction in the speed of the carriage 16 is detected. An overproportional braking torque is then generated by the drive motor 20. This is apparent in FIG. 4.

When the carriage speed 68 decreases, as in the range 74, the motor torque 66 is reduced considerably in the range 76 and 78 and, in particular, overproportionally which leads to an overproportional reduction in the speed of the carriage 16. As a result, an increased braking torque is again generated, i.e., the carriage 16 is braked by a braking assistant.

Figure 5:
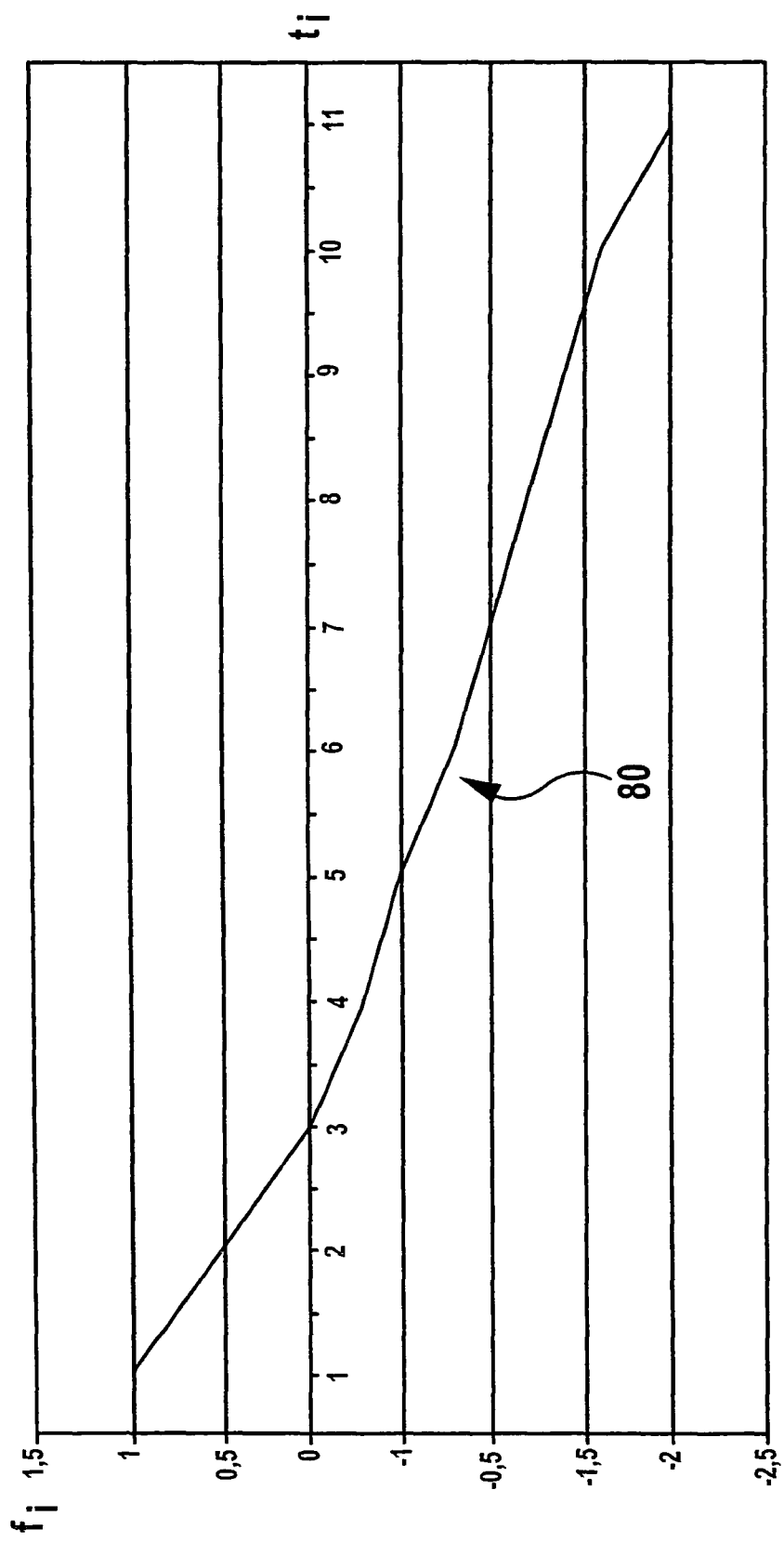
FIG. 5 shows a diagram of braking factors $f_i$ in a time frame $t_1$ to $t_{11}$ for a braking function of a braking assistant (characteristic curve of a braking assistant).

The braking assistant can be realized via a characteristic curve 80 (braking function) of the braking assistant, as shown by way of example in FIG. 5. The characteristic curve 80 of the braking assistant comprises in a time frame $t_1$ to $t_{11}$ predetermined braking factors $f_i$ which are stored, for example, as discrete values in table form in the control device 52. When a reduction in the speed of the carriage 16, i.e., a negative acceleration is recognized by the control device 52, this braking function is activated.

In accordance with the assistance profile 54, a specific motor torque value is associated with every speed v of the carriage 16. The characteristic curve 80 of the braking assistant comprises factors $f_i$ for the modification of the motor torque value which results in the case of a predetermined speed in accordance with the assistance profile 54. Proceeding from the time $t_1$ with the braking factor $f_1=1$, at which the motor torque value according to the assistance profile 54 is present, a series of braking factors $f_2$ to $f_{11}$ are run through at fixed time intervals $\Delta t = t_{i-1} - t_i$ within the time frame $t_1$ to $t_{11}$ which has, for example, a length of 10 ms. As a result of a braking factor of less than one, the torque is reduced, wherein in the case of negative braking factors a negative torque is generated which exerts a counterforce in order to bring about a braking force in this way. When a braking factor $f_i$ unequal to one is effective, the drive motor 20 then exerts a motor torque which deviates from the assistance profile 54. A new speed then results. At the following point in time $t_{i+1}$, a new motor torque is set in accordance with the braking factor $f_{i+1}$ which is then determined and this leads again to a new speed.

The characteristic curve 80 of the braking assistant with its braking factor $f_i$ is selected such that braking is achieved, in particular, as far as the speed zero. The braking factors preferably decrease for this purpose within the time frame $t_1$ to $t_{11}$ proceeding from the value one and become negative. As a result of the negative braking factors (in FIG. 5 $f_5$ to $f_{11}$) within the time frame, a temporary braking motor torque is generated which in the case of the embodiment shown in FIG. 5 of a characteristic curve of the braking assistant is effective over a period of time which is shorter than the time frame. In the embodiment shown, a negative motor torque (braking torque) is effective over a period of time of 8 ms.

The speed of the carriage 16 which occurs during the processing of the braking function 80 with an activated braking assistant is determined by the characteristic curve itself, wherein the actual speed reached is also influenced by the load on the carriage 16, the strength of the braking pulses and the initial speed of the carriage 16.

It may happen that with an activated braking assistant, while the characteristic curve 80 of the braking assistant is being followed, the speed of the carriage 16 is increased again due to an operator exerting a counterforce. It is then provided for the characteristic curve 80 of the braking assistant not to be followed as far as the end with braking factors $f_i$ becoming ever smaller but rather to be followed in the opposite direction—towards higher braking factors $f_i$. As a result, a smooth transition between braking and normal carriage movement may be achieved. The characteristic curve 80 of the braking assistant is preferably followed in the opposite direction with smaller time intervals than during the run through for the purpose of braking the carriage 16. This likewise assists the smooth transition between braking and normal movement of the carriage 16.

The braking assistant also includes the safety function that the carriage 16 stops by itself when pushed since the carriage 16, when it is not guided further by hand, loses speed and, therefore, the braking assistant is also activated.

One safety function may be realized, with which the carriage 16 is automatically braked when it, after reaching the rearward return point of a carriage guide which is remote from the operator, reaches the other, forward return point of the carriage guide within a predetermined period of time. In the illustration according to FIG. 1, the carriage moves at right angles to the plane of drawing, wherein the forward return point is located to the front and the rearward return point to the rear.

The rearward return point must always be reached in order to complete a cut on a product to be cut. After reaching the return point, the operator moves the carriage 16 in the opposite direction towards the other return point. Except in the case of a very wide product to be cut, the forward return point is not normally reached since an operator, in order to achieve a greater number of cycles, does not move the carriage 16 the entire distance between the rearward return point and the forward return point but rather shortens the carriage stroke.

When a check is made as to whether the carriage 16 reaches the forward return point (once it has reached the rearward return point) and then a check is made as to the time within which it has reached the forward return point proceeding from the rearward return point, any uncontrolled running of the carriage 16 along its guide path may be prevented. The carriage is braked automatically when it reaches the forward return point proceeding from the rearward return point within the predetermined period of time, i.e., below a predetermined limit time. If the time limit is exceeded, no automatic braking takes place.

The braking may, for example, result via a braking pulse of the drive motor 20. The carriage 16 is stopped automatically by means of such a braking torque. As a result, any continued running and, in particular, any uncontrolled movement of the carriage 16 back and forth on the guide path is prevented.

The limit time, below which the carriage 16 is braked automatically, can be stored as fixed data in the control device 52 or be calculated by this device on the basis of actual parameters of the food product slicing machine 10. The strength and length of the braking pulse for braking the carriage 16 can be stored or also calculated on the basis of actual apparatus parameters.

In the case of the inventive method, a variable, non-linear assistance for the carriage movement in the servo operating mode is achieved and so an easy and jerk-free starting up of the carriage 16 may be achieved with an easy-running carriage guidance; the operator has a natural feel when moving the carriage 16.

In addition, a braking assistant may be provided which generates an overproportional braking torque when the carriage 16 slows down and so the carriage 16 is braked with little expenditure of force when, for example, it is lightly drawn in the opposite direction and a quick reversal of direction is achieved. In addition, the safety is increased since the carriage 16 automatically stops when given a push.

The invention claimed is:

1. A food product slicing machine comprising:
a circular knife defining a cutting plane;
a carriage for accommodating food products to be cut, said carriage being guided for movement parallel to the cutting plane of the circular knife, said parallel movement defining an axis of movement, and the carriage having at least one parameter related to said movement;
a drive motor operatively connected to the carriage for providing the movement of the carriage along said axis;
a sensor for detecting said at least one parameter of the carriage movement, the at least one parameter being and selected from a speed and an acceleration of the carriage movement; and
a control device operatively connected to the drive motor and to the sensor, said control device selectively controlling the drive motor based on a selected operating mode;
the machine having a servo operating mode wherein the carriage is moveable manually and the drive motor provides assistance to the manual movement of the carriage;
wherein, in the servo operating mode, the drive motor has a motor torque that is controlled by the control device as a function of the at least one parameter of the carriage movement and, as a result, the assistance provided by the drive motor in the servo operating mode is dependent on the at least one parameter of the carriage movement, and
wherein the motor torque of the drive motor is further controlled in accordance with a predetermined travel profile for further controlling the movement of the carriage, the travel profile having a start-up range, a limiting range, and a central range therebetween, wherein the ranges are dependent on the carriage position along said one axis.

2. The food product slicing machine as defined in claim 1, wherein the assistance for the carriage movement in the servo operating mode is non-linear in relation to the at least one parameter of the carriage movement.

3. The food product slicing machine as defined in claim 2, wherein the assistance for the carriage movement is overproportionally greater at low speeds of the carriage than at high speeds of the carriage.

4. The food product slicing machine as defined in claim 1, wherein the carriage is operable at relatively low speeds, medium speeds and high speeds and wherein the start-up range is for low speeds, the central range is for medium speeds and the limiting range is for high speeds.

5. The food product slicing machine as defined in claim 4, wherein the start-up range of the travel profile is the steepest with respect to the at least one parameter of the carriage movement.

6. The food product slicing machine as defined in claim 4, wherein in the limiting range of the travel profile is the flattest with respect to the at least one parameter of the carriage movement.

7. The food product slicing machine as defined in claim 4, wherein the travel profile comprises a gradient in the start-up range, a gradient in the central range and a gradient in the limiting range, the gradient in the travel profile in the central range being between the gradient in the start-up range and the gradient in the limiting range.

8. The food product slicing machine as defined in claim 1, wherein the motor torque of the drive motor is limited to a maximum value in accordance with the travel profile.

9. The food product slicing machine as defined in claim 1, wherein strength of the assistance is adjustable.

10. The food product slicing machine as defined in claim 1, wherein the assistance and the predetermined travel profile are part of predetermined assistance profile, and the predetermined assistance profile is a selected one among different predetermined assistance profiles stored in the control device.

11. The food product slicing machine as defined in claim 10, wherein the predetermined assistance profile can be generated in a learning mode by specifying the carriage movement.

12. The food product slicing machine as defined in claim 1, wherein an automatic operating mode is provided, the carriage moving back and forth automatically during said automatic operating mode.

13. The food product slicing machine as defined in claim 1, wherein a manual operating mode is provided, the carriage being moved purely manually during said manual operating mode.

14. The food product slicing machine as defined in claim 1, wherein the sensor is part of a displacement measuring device, the carriage having multiple positions along a carriage guide path, said positions being determinable absolutely via said displacement measuring device at any point in time during at least operation of the food product slicing machine.

15. The food product slicing machine as defined in claim 1, wherein the sensor is part of a displacement measuring device, and wherein the speed or acceleration of the carriage movement is determined by a time-related location determination of the carriage position using the displacement measuring device.

* * * * *